US008321050B2

(12) United States Patent
Rivenbark, Jr. et al.

(10) Patent No.: US 8,321,050 B2
(45) Date of Patent: Nov. 27, 2012

(54) DEVICE FOR SELECTIVELY PRESENTING OBJECTS

(76) Inventors: James Robert Rivenbark, Jr., Raleigh, NC (US); William Bradford Carpenter, Raleigh, NC (US)

( * ) Notice: Subject to any disclaimer, the term of this patent is extended or adjusted under 35 U.S.C. 154(b) by 0 days.

(21) Appl. No.: 13/535,871

(22) Filed: Jun. 28, 2012

(65) Prior Publication Data

US 2012/0265335 A1 Oct. 18, 2012

(51) Int. Cl.
*G06F 19/00* (2006.01)
*G06F 17/00* (2006.01)
*G06F 7/10* (2006.01)
*G11B 21/08* (2006.01)

(52) U.S. Cl. ........ 700/213; 700/214; 700/231; 700/232; 235/462.01; 369/34.01

(58) Field of Classification Search ........................ None
See application file for complete search history.

(56) References Cited

U.S. PATENT DOCUMENTS

| | | | | |
|---|---|---|---|---|
| 4,530,183 | A | | 7/1985 | Heise et al. |
| 4,581,849 | A | | 4/1986 | Schwarz |
| 5,647,173 | A | | 7/1997 | Stark et al. |
| 5,653,056 | A | | 8/1997 | Stark |
| 5,936,918 | A | * | 8/1999 | Ohba et al. ................ 369/30.31 |
| 6,026,063 | A | | 2/2000 | Ohba et al. |
| 6,439,406 | B1 | | 8/2002 | Duhon |
| 7,228,198 | B2 | | 6/2007 | Vollm et al. |
| 7,988,049 | B2 | | 8/2011 | Kuehnrich |

OTHER PUBLICATIONS

Savaria Concord Your Accessibility Partners; Commander Automatic Door Opener; http://www.savariaconcord.com/commander.htm.

* cited by examiner

*Primary Examiner* — Gene Crawford
*Assistant Examiner* — Yolanda Jones
(74) *Attorney, Agent, or Firm* — Myers Bigel Sibley & Sajovec

(57) ABSTRACT

An assembly for selectively presenting objects includes: a frame; a carousel rotatably mounted to the frame for rotation about a generally vertical axis of rotation, the carousel including a plurality of object compartments arranged about the axis of rotation; a servomotor operably connected with the carousel, the servomotor being configured to rotate the carousel about the axis of rotation; and a controller. The controller is configured to actuate the servomotor to rotate the carousel when torque applied to the servomotor exceeds a predetermined magnitude. Such an assembly can serve as a presentation device that enables an operator to remove objects therefrom at his/her convenience.

10 Claims, 11 Drawing Sheets

DEVICE FOR SELECTIVELY PRESENTING OBJECTS

RELATED APPLICATION

This application claims priority from U.S. patent application Ser. No. 12/420,223, filed on Apr. 8, 2009, which claims priority from U.S. Provisional Patent Application No. 61/050,371, filed May 5, 2008 and entitled DEVICE FOR SELECTIVELY PRESENTING OBJECTS, the disclosures of which are hereby incorporated herein in their entirety.

FIELD OF THE INVENTION

The present invention is directed generally to devices that present a number of objects for retrieval, and more specifically to devices that selectively present the objects for retrieval.

BACKGROUND OF THE INVENTION

Pharmacy generally began with the compounding of medicines, which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. Different exemplary approaches are shown in U.S. Pat. No. 5,337,919 to Spaulding et al. and U.S. Pat. Nos. 6,006,946; 6,036,812 and 6,176,392 to Williams et al. The Williams system conveys a bin with tablets to a counter and a vial to the counter. The counter dispenses tablets to the vial. Once the tablets have been dispensed, the system returns the bin to its original location and conveys the vial to an output device. Tablets may be counted and dispensed with any number of counting devices. Drawbacks to these systems typically include the relatively low speed at which prescriptions are filled and the absence in these systems of securing a closure (i.e., a lid) on the container after it is filled.

One additional automated system for dispensing pharmaceuticals is described in some detail in U.S. Pat. No. 6,971,541 to Williams et al. This system has the capacity to select an appropriate vial, label the vial, fill the vial with a desired quantity of a selected pharmaceutical tablet, apply a cap to the filled vial, and convey the labeled, filled, capped vial to an offloading station for retrieval. The system discussed therein employs forced air that agitates tablets within a bin. The agitated tablets are conveyed via suction in singulated fashion through an outlet into the vial.

Typically a system like that discussed in U.S. Pat. No. 6,971,541 to Williams et al. has a section of the offload station for "exceptions," which are vials that are unsuitable for distribution to customers. Potential reasons for exceptions include an incorrect number of tablets in the vial, incorrect or inadequate labeling, an uncapped or loosely capped vial, and the like. Because the system is highly automated, it is desirable to provide an area in which a robotic arm or other carrier that moves the vial within the system can drop off exceptions for subsequent handling by a pharmacist or technician. The exception area would desirably be easily accessible from the exterior of the system (i.e., similar access to that for correctly filled vials), yet would also account for the possibility of vials being uncapped or loosely capped, such that tablets would not spill from the vial upon placement of the vial in the exception area or removal therefrom.

SUMMARY OF THE INVENTION

As a first aspect, embodiments of the present invention are directed to an assembly for selectively presenting objects. The assembly comprises: a frame; a carousel rotatably mounted to the frame for rotation about a generally vertical axis of rotation, the carousel including a plurality of object compartments arranged about the axis of rotation; a servomotor operably connected with the carousel, the servomotor being configured to rotate the carousel about the axis of rotation, the servomotor associated with a detector; and a controller, the controller configured to actuate the servomotor to rotate the carousel when the detector detects a user's attempt to rotate the carousel as the carousel is substantially stationary. Such an assembly can serve as a presentation device that enables an operator to remove objects therefrom at his/her convenience.

As a second aspect, embodiments of the present invention are directed to a system for automatically dispensing pharmaceuticals. The system includes a machine for automatically dispensing pharmaceuticals into vials and an exception vial assembly operably associated with the machine. The exception vial assembly is configured to receive exception vials produced by the machine and present the exception vials to an operator for removal from the system.

As a third aspect, embodiments of the present invention are directed to a method of controlling the presentation of objects with a rotary member. The method comprises the steps of: (a) detecting, with a controller, a level of angular displacement experienced by the rotary member, the rotary member housing at least one object; (b) if the magnitude of the detected angular displacement is below a predetermined level, maintaining an angular position of the rotary member; and (c) if the magnitude of the detected angular displacement exceeds the predetermined level, rotating the rotary over a predetermined angular distance to present the object at a new angular position.

As a fourth aspect, embodiments of the present invention are directed to a method of retrieving an object from a carousel, comprising the steps of: providing a carousel with a plurality of compartments, each of the compartments sized to contain one or more objects, the carousel being rotatable via a servomotor; with a controller, detecting an attempt by a user to rotate the carousel; and in response to the detecting step, rotating the carousel via the servomotor over a predetermined angle to present an object in a compartment to the user.

DETAILED DESCRIPTION OF EMBODIMENTS OF THE INVENTION

Figure 1:
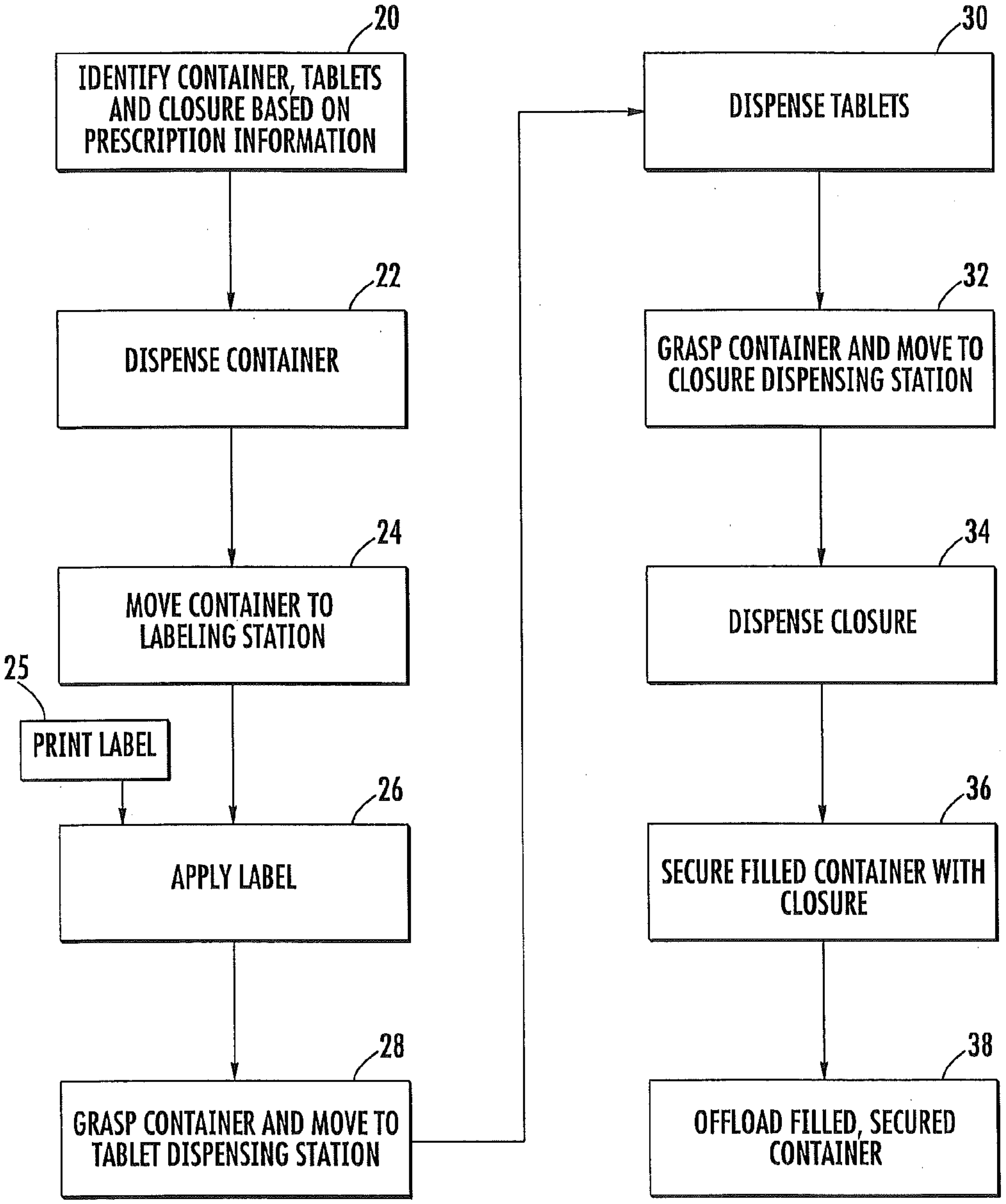
FIG. 1 is a flow chart depicting operations that can be carried out by an automated pharmacy machine according to embodiments of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Also, as used herein, the terms "downstream" and "upstream," which are often used in manufacturing environments to indicate that certain material being acted upon is farther along in the manufacturing process than other material, are intended to indicate relative positions of components along a path following by a substantially continuous paper sheet that travels along and through the components. A component that is "downstream" from another component means that the first component is positioned farther along the paper path, and a component that is "upstream" from another component means that the first component is nearer the origin of the paper path. It should be noted that, relative to an absolute x-y-z coordinate axis system, these directions shift as the paper is conveyed between different operations. When they occur, these shifts in absolute direction are noted hereinbelow, and the downstream direction is redefined with reference to structures illustrated in the drawings.

Well-known functions or constructions may not be described in detail for brevity and/or clarity.

As described above, the invention relates generally to a system and process for dispensing pharmaceuticals. An exemplary process is described generally with reference to FIG. 1. The process begins with the identification of the proper container, tablets or capsules and closure to be dispensed based on a patient's prescription information (Box 20). A container of the proper size is dispensed at a container dispensing station (Box 22), then moved to a labeling station (Box 24). A printing station prints a label (Box 25) that is applied at the labeling station (Box 26), after which the container is transferred to a tablet dispensing station (Box 28), from which the designated tablets are dispensed in the designated amount into the container (Box 30). The filled container is then moved to a closure dispensing station (Box 32), where a closure of the proper size has been dispensed (Box 34). The filled container is secured with a closure (Box 36), then transported to an offload station and offloaded (Box 38).

Figure 2:
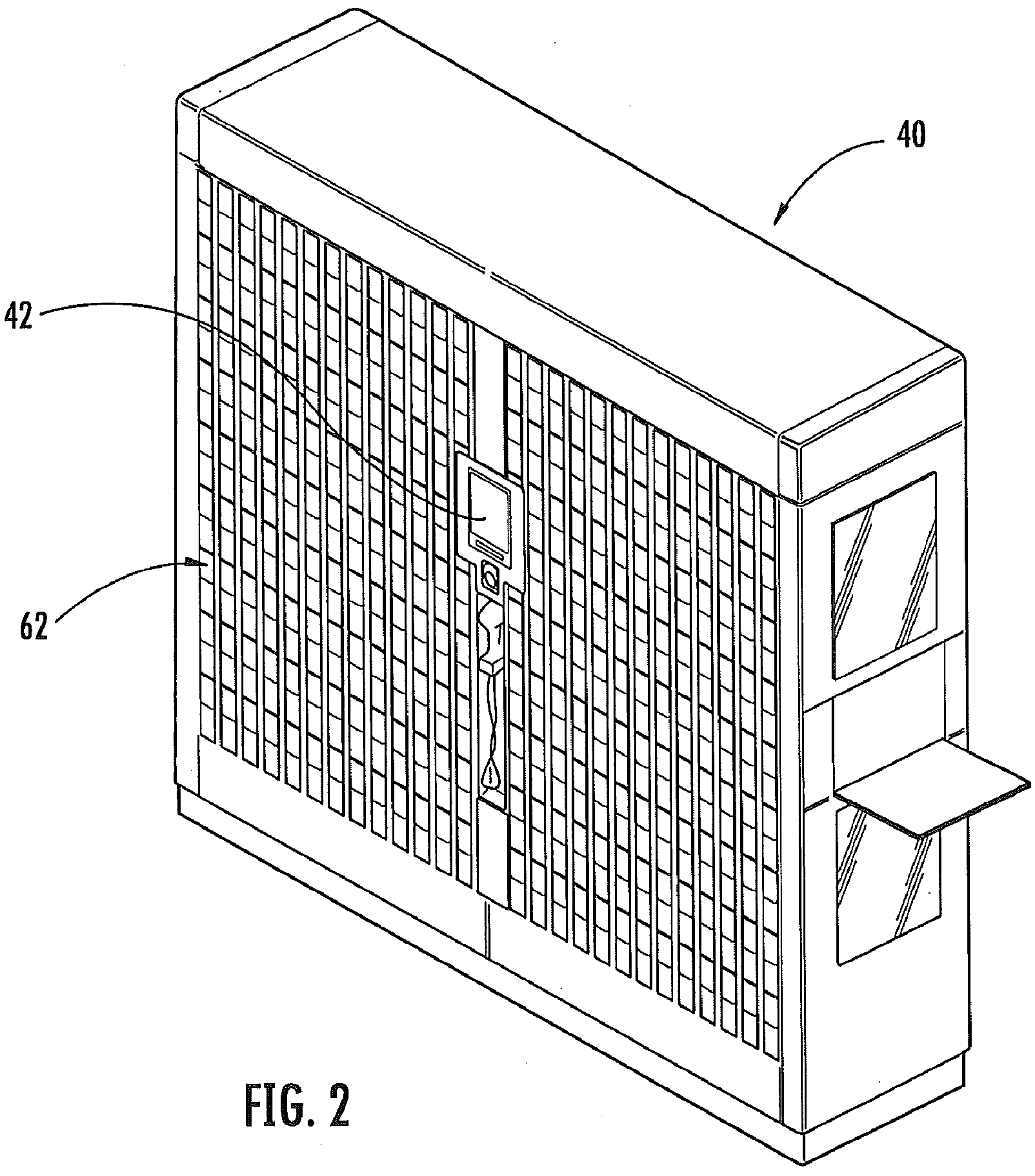
FIG. 2 is a front perspective view of an automated pharmacy machine according to embodiments of the present invention.
Figure 3:
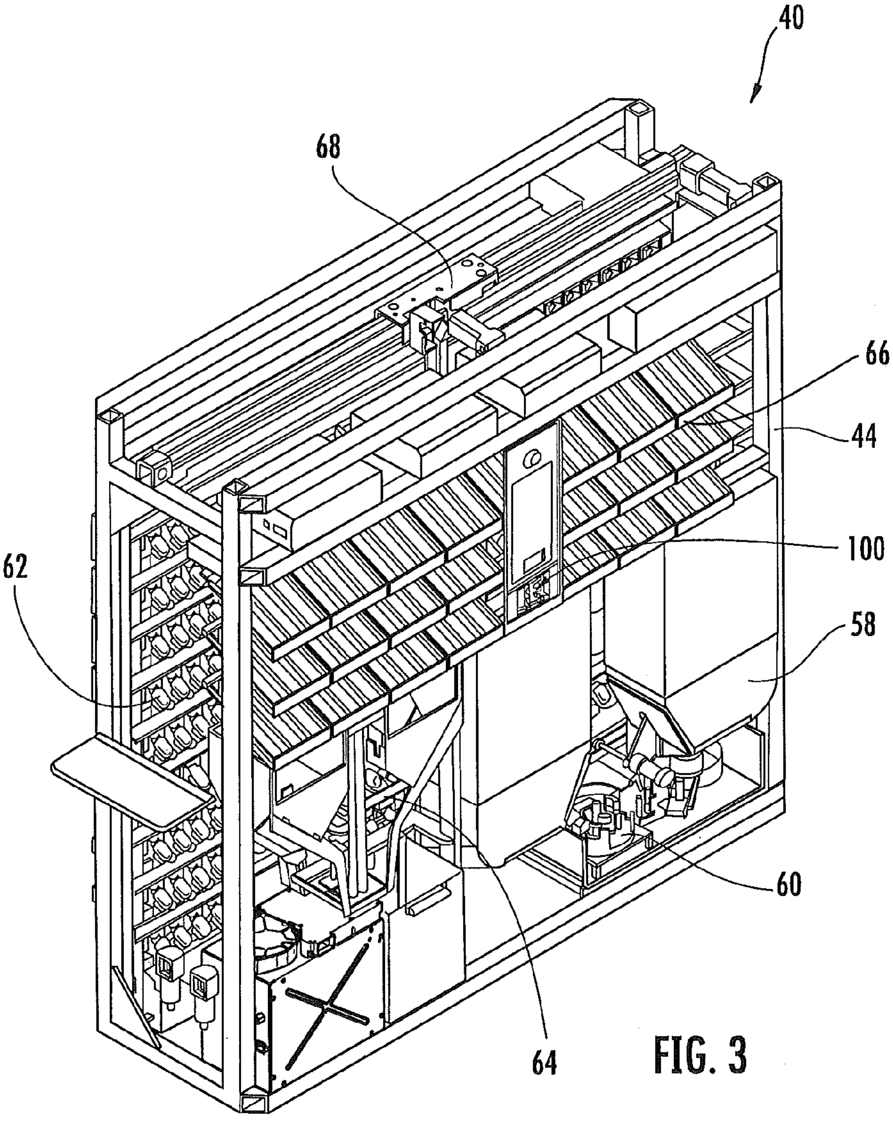
FIG. 3 is an opposite side front perspective view of the automated pharmacy machine of FIG. 2 with the outer skin removed to permit visual access to components housed therein.

A system that can carry out this process is illustrated in FIGS. 2 and 3 and designated broadly therein at 40. The system 40 includes a support frame 44 for the mounting of its various components. The system 40 generally includes as operative stations a controller (represented herein by a graphics user interface monitor 42), a container dispensing station 58, a labeling station 60, a tablet dispensing station 62, a closure station 64, and an offloading station 66. In the illustrated embodiment, containers, tablets and closures are moved between these stations with a single carrier 68; however, in some embodiments additional carriers may be employed. The operation of the container dispensing station 58, the labeling station 60, the tablet dispensing station 62, the closure station 64, and the offloading station 66 are described in, for example, U.S. patent application Ser. Nos. 11/599,526; 11/599,576; 11/679,850; 11/693,929; 11/755,249; 11/927,865; and 11/111,270, the disclosure of each of which is hereby incorporated herein in its entirety.

The system 40 also includes a vial exception assembly 100, which is located on the same side of the system 40 as the offload station 66 (see FIG. 3). The exception assembly 100, which includes a frame 102 (see FIGS. 4-6), a carousel 120, and a motor 140, is described in detail below.

Figure 4:
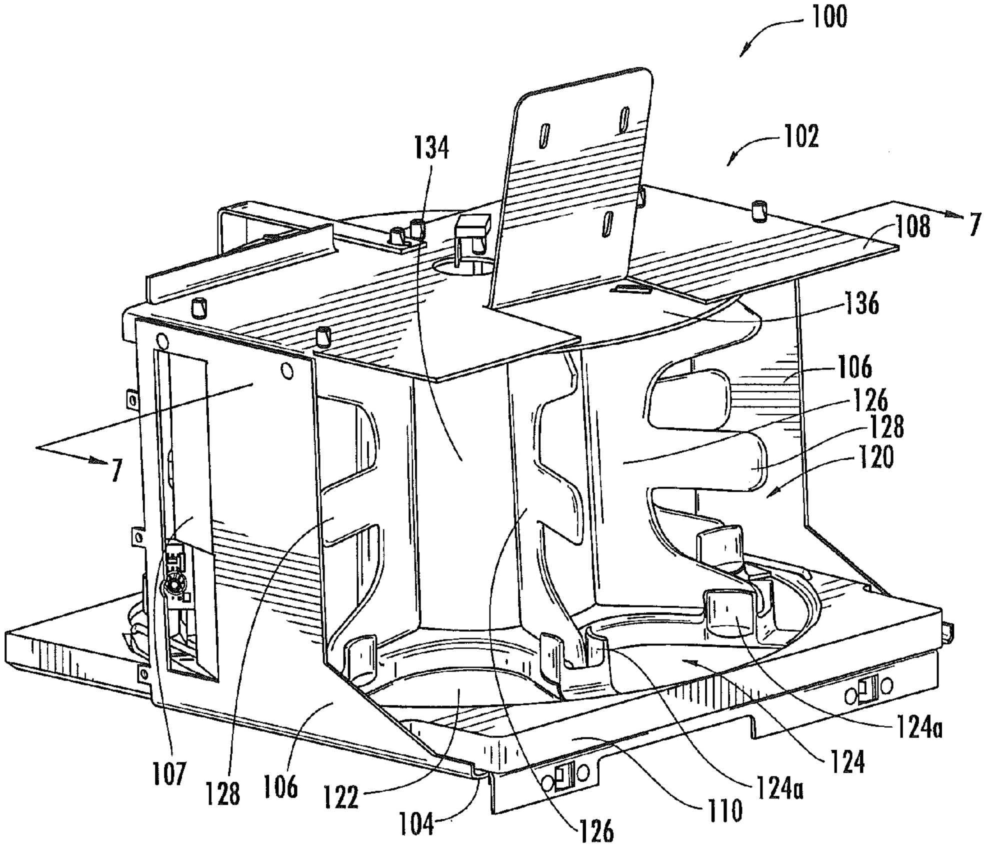
FIG. 4 is a front perspective view of an exception assembly of the automated pharmacy machine shown in FIGS. 2 and 3.
Figure 5:
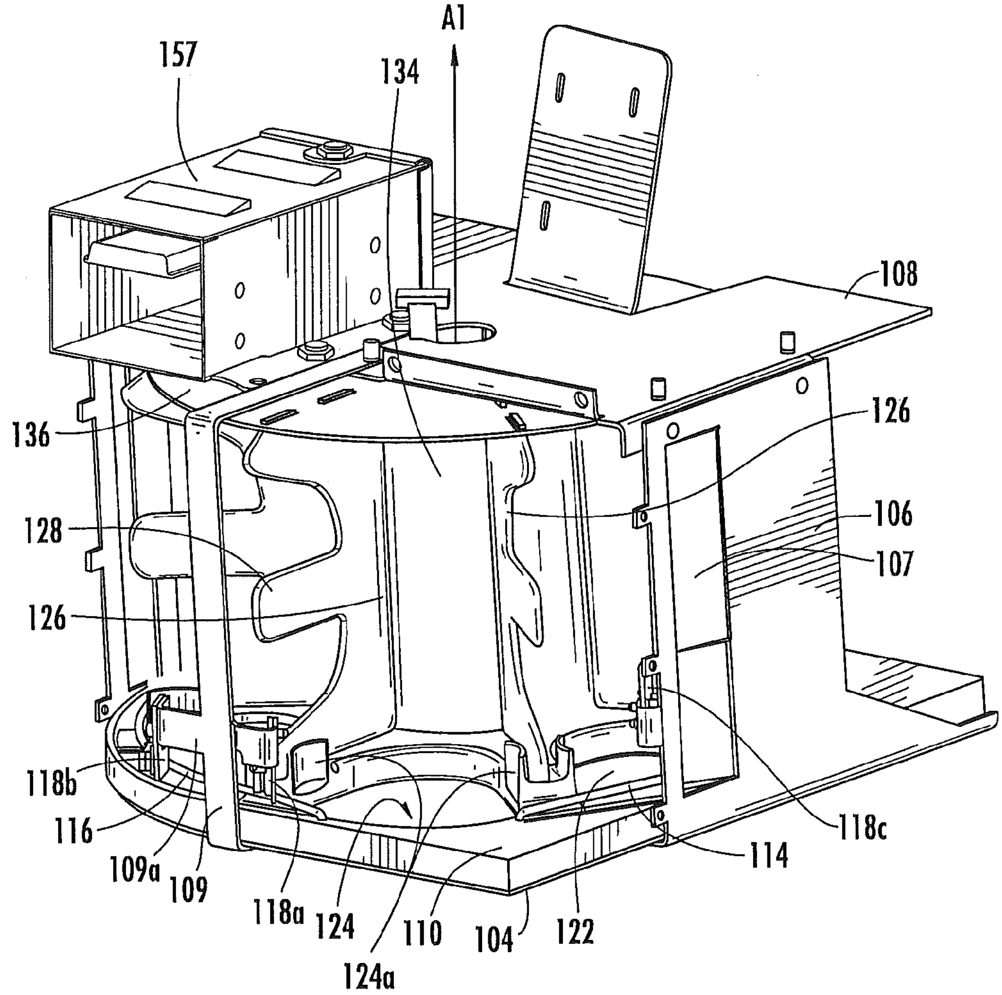
FIG. 5 is a rear perspective view of the exception assembly of FIG. 4.

Turning now to FIGS. 4 and 5, the frame 102 is fixed to the frame 44 of the system 40. The frame 102 includes a floor 104 and walls 106 that are, in this embodiment, integrally formed. Vertical flaps 107 are located in the rearward portions of the walls 106. A ceiling 108 is mounted to and spans the upper ends of the walls 106. A sensor support bracket 109 spans the floor 104 and the ceiling 108.

A base 110 is mounted to the floor 104. The base 110 includes a circular recess 112 (FIGS. 6 and 7) in its center portion. A guide rod 114 extends along one side of the recess 112 and overlies an outer portion thereof; on the opposite side, a guide rod 116, extends along the edge of the recess and also overlies an outer portion thereof. In addition, two sensors 118*a*, 118*b* are mounted to opposite ends of a cross-member 109*a* that is mounted to the divider 109; also, an emitter 118*c* is mounted to a rear edge of one of the walls 106.

Figure 6:
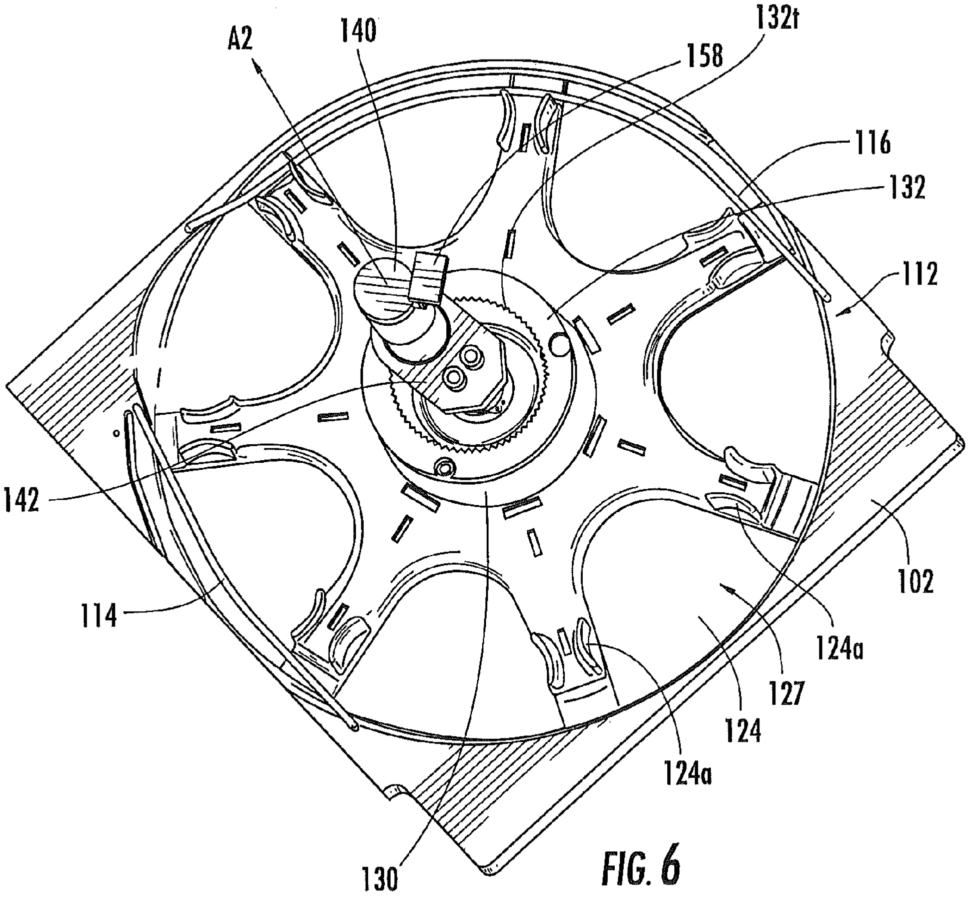
FIG. 6 is a top partial perspective view of the exception assembly of FIG. 4, with the ceiling of the frame, the top plate of the carousel, and the cover of the carousel removed.

Referring to FIGS. 4-6, the carousel 120 includes a base 122, a cylindrical central cover 134, and a top plate 136. The base 122 and the top plate 136 are generally parallel with each other, with the base 122 nesting within the recess 112 of the base 110, and the top plate 136 fitting just beneath the ceiling 108. A plurality of recesses 124 (in this instance seven recesses 124) are formed into the base 122. The recesses 124 are generally semicircular or semi-oval in shape; a radius of between about 1 and 4 inches is typical. Two upstanding finger tabs 124*a* project upwardly from the radially-outward edges of each of the recesses 124. Partitions 126 are mounted between the recesses 124, extend upwardly therefrom to meet the top plate 136, and radiate outwardly from the cover 134. Each of the partitions 126 includes a pair of cutaway areas such that an outwardly-radiating finger 128 is formed.

As can be seen in FIGS. 4-6, the base 122, the top plate 136, the cover 134, and the partitions 126 form a plurality of compartments 127 (in this instance seven) around the cover 134. Each of the compartments 127 is separated from adjacent compartments 127 by two partitions 126.

Figure 7:
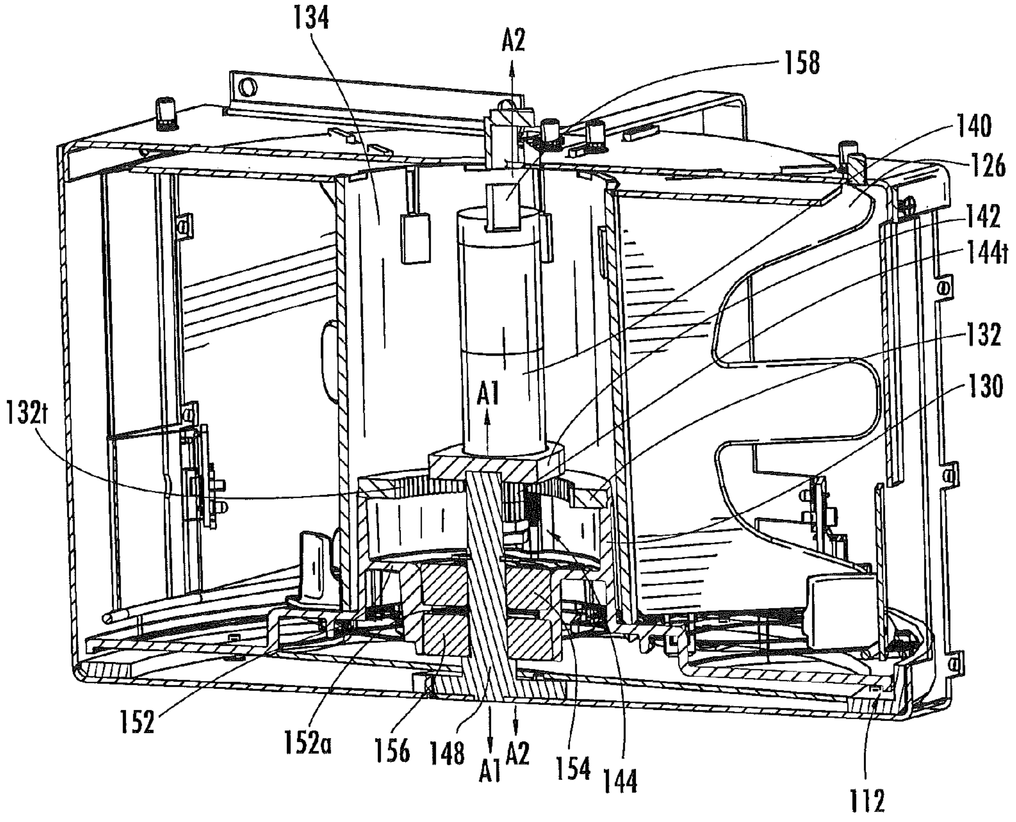
FIG. 7 is a section view of the exception assembly of FIG. 4 taken along lines 7-7 thereof.

As can be seen in FIGS. 6 and 7, the cover 134 covers a round, stepped hub 130 that projects upwardly from the center of the base 122. An inwardly extending flange 152, L-shaped in cross-section, projects from the hub 130. Also, a ring gear 132 with radially-inwardly projecting teeth 132*t* is mounted on top of the hub 130. An axis A1 extends perpendicular to the plane defined by the ring gear 132.

Referring now to FIGS. 6 and 7, the motor 140 (in this embodiment a servomotor) is located inside the cover 134. The motor 140 includes a downwardly-extending shaft on which is mounted a drive gear 144 with teeth 144*t*. The shaft (not visible herein) defines an axis A2. The motor 140 is located such that the teeth 144*t* of the drive gear 144 mate with the teeth 132*t* of the ring gear 132. The motor 140 is mounted to a motor mount arm 142, which extends for mounting atop a centrally located pedestal 148 that is fixed to the floor 104. Upper and lower bearings 154, 156 are attached to the pedestal below the motor mount arm 142 (with a lip 152*a* being positioned between the upper and lower bearings 154, 156); each of the bearings has an inner race that is fixed to the pedestal 148 and an outer race that is fixed to the vertical portion of the flange 152, such that the carousel 120 can rotate relative to the pedestal 148 about the axis A1.

Referring back to FIG. 5, a servocontroller 157 or other detector is mounted to the upper surface of the ceiling 108 and is connected to the motor 140. The servocontroller 157 monitors the angular position of the motor 140 and signals the controller 42 in the event that the angular position changes more than a specified threshold. A wiring support 158 is attached to the upper end of the motor 140 to provide support for the wiring of the motor 140 and servocontroller 157.

As can be understood from FIGS. 4-7, activation of the motor 140 by the controller 42 rotates the motor shaft 142 and, in turn, the drive gear 144 about the axis A2. Because the teeth 144*t* of the drive gear 144 mesh with the teeth 132*t* of the ring gear 132, rotation of the drive gear 144 causes the ring gear 132 to rotate in the same rotative direction about the axis A1. Rotation of the ring gear drives the carousel 120 around the axis A1.

Figure 8:
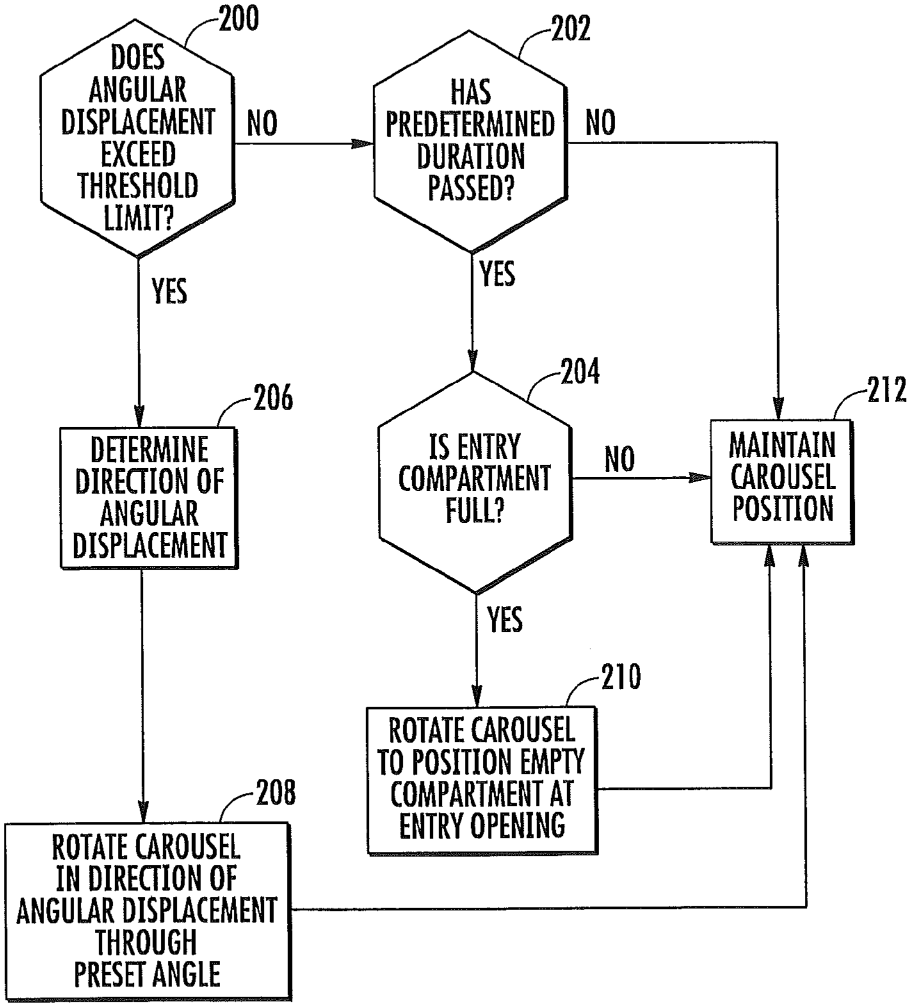
FIG. 8 is a flow chart illustrating exemplary operations of the exception assembly of FIG. 4.

Turning now to FIG. 8, within the controller 42, programmable logic is configured to control the motor 140, which in turn controls the movement of the carousel 120 relative to the base 110 and frame 102. More specifically, as a steady state condition, the controller 42 maintains the shaft 142 of the motor 140 in a particular angular position about the axis A1 (box 212). If, as monitored by the servocontroller 157, the magnitude of the angular displacement of the shaft 142 is lower than a predetermined threshold (box 200), the controller 42 signals the servocontroller 157 to maintain the angular position of the shaft 142. If instead the angular displacement of the shaft 142 is exceeded (box 200), the controller 42, via the servocontroller 157, determines the direction of the angular displacement (box 206) and instructs the motor 140 to rotate the shaft 142 (and, in turn, the carousel 120) in the rotational direction of the angular displacement for a preset angular distance (box 208).

Also, if there has been no angular displacement for a predetermined duration (boxes 200 and 202), the controller 42 detects whether the entry compartment 127 is full (box 204) (this detection typically involves one or more of the sensors 118*a*, 118*b*). If the entry compartment 127 is full, the controller 42 will signal the motor 140 to rotate the carousel 120 to position an empty compartment 127 at the entry opening 127*a* (box 210).

In addition, the controller 42 can, absent an applied angular displacement, instruct the motor 140 to rotate the carousel 120 about the axis A1 for a preset angular distance, typically based on a user's instructions. Such user input may be entered into the system in some manner other than direct interaction with the carousel 120, such as through a user interface or one or more buttons included for this purpose (not shown).

Further, those skilled in this art will appreciate that angular displacement need not be the determining condition detected by the motor 140 in order to initiate rotation. For example, the magnitude of torque experienced by the motor shaft 142 may be used to determine whether an operator is attempting to rotate the carousel 120 rather than angular displacement. Other properties or relationships may also be used to detect an attempt to rotate the carousel, after which the carousel is rotated as described above.

Figure 9:
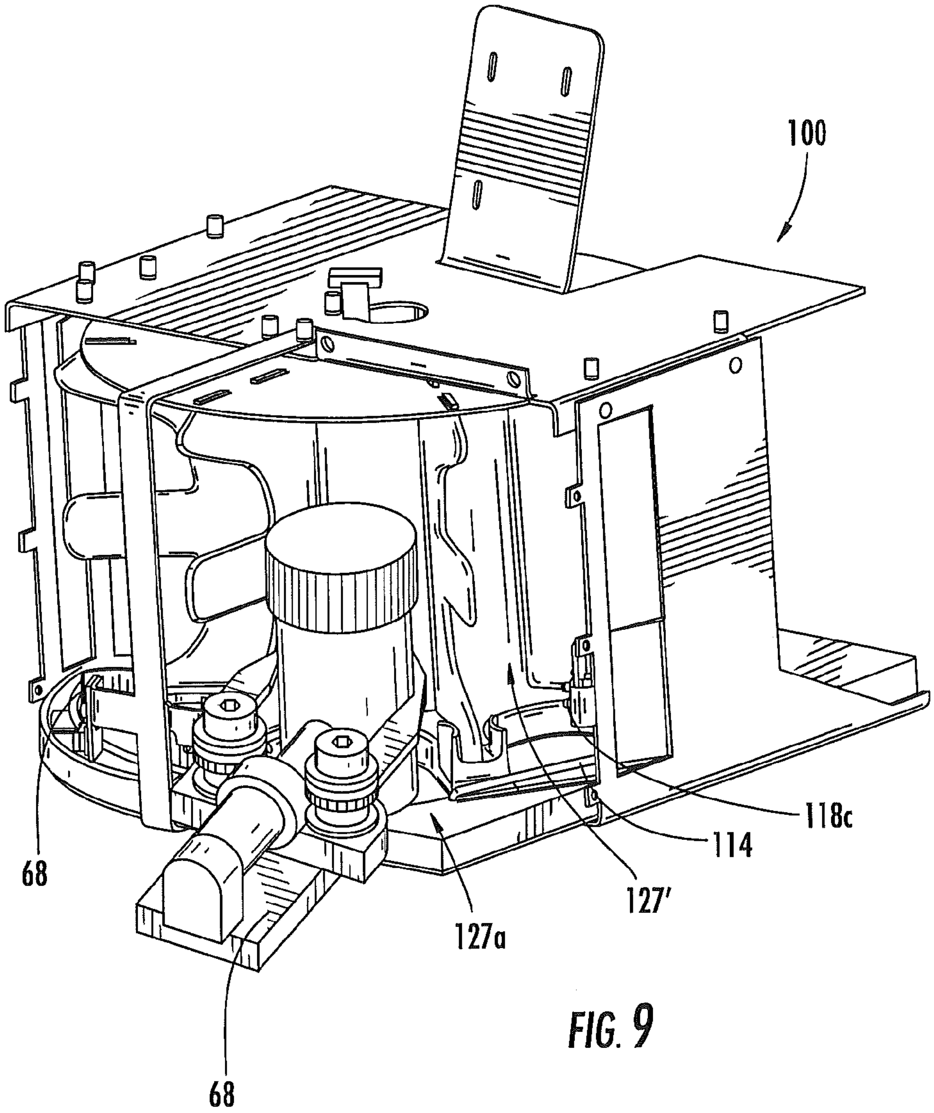
FIG. 9 is a rear perspective view of the exception assembly of FIG. 4 showing the placement of an exception vial in a compartment.

Thus, in operation, most of the time the carousel 120 experiences little to no angular displacement, and thus remains in a stationary position. As shown in FIG. 9, in this position, the carousel 120 presents a compartment 127 to the interior of the system 40, such that the carrier 68 can deliver a vial (presumably an exception vial) to the compartment 127 through an entry opening 127*a*. Entry of the carrier 68 is facilitated by the absence of either of the guide rods 114, 116 across the mouth of the compartment 127. The presence of the vial in the compartment 127 can be detected by the sensors 118*a*, 118*b*, which provide this information to the controller 42. In some embodiments, the controller 42 then rotates the carousel 120 such that the compartment 127 that houses the exception vial moves away from the entry opening 127*a* and another compartment 127' moves into position behind the entry opening 127*a*. In this position, the compartment 127' can receive a second exception vial. This process can (but need not) be repeated until each of the compartments 127 houses an exception vial.

Figure 10:
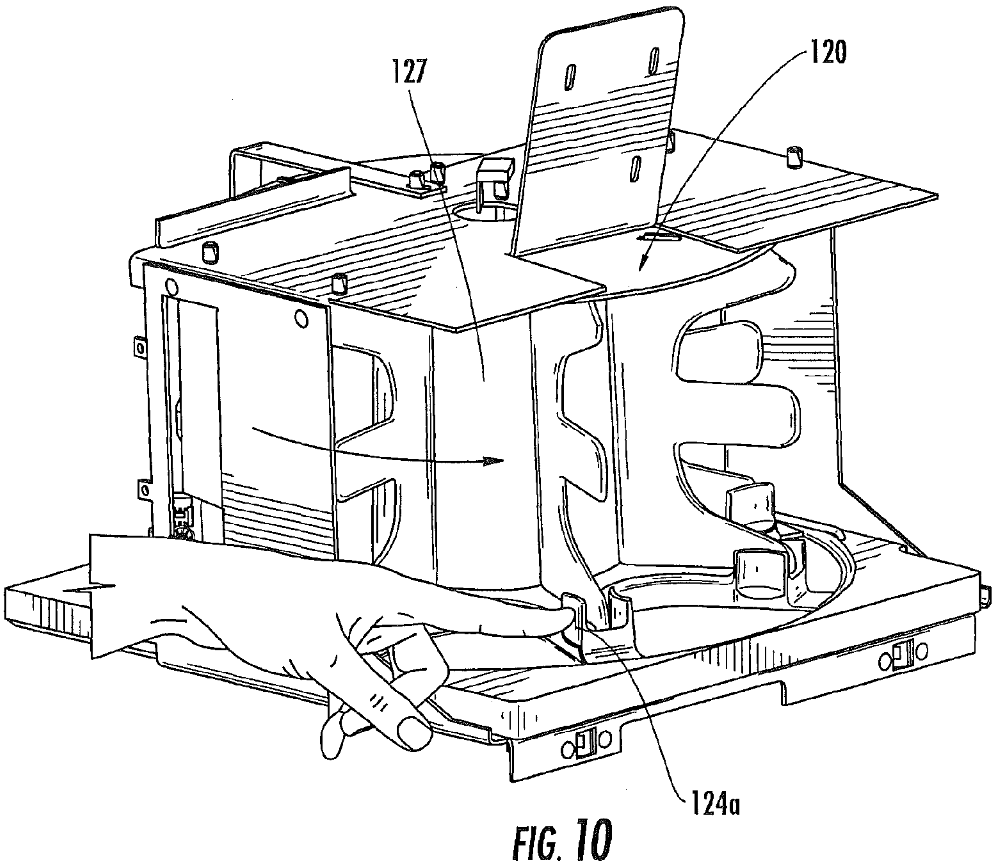
FIG. 10 is a front perspective view of the exception assembly of FIG. 4 showing the application of finger pressure by an operator to actuate the assembly.
Figure 11:
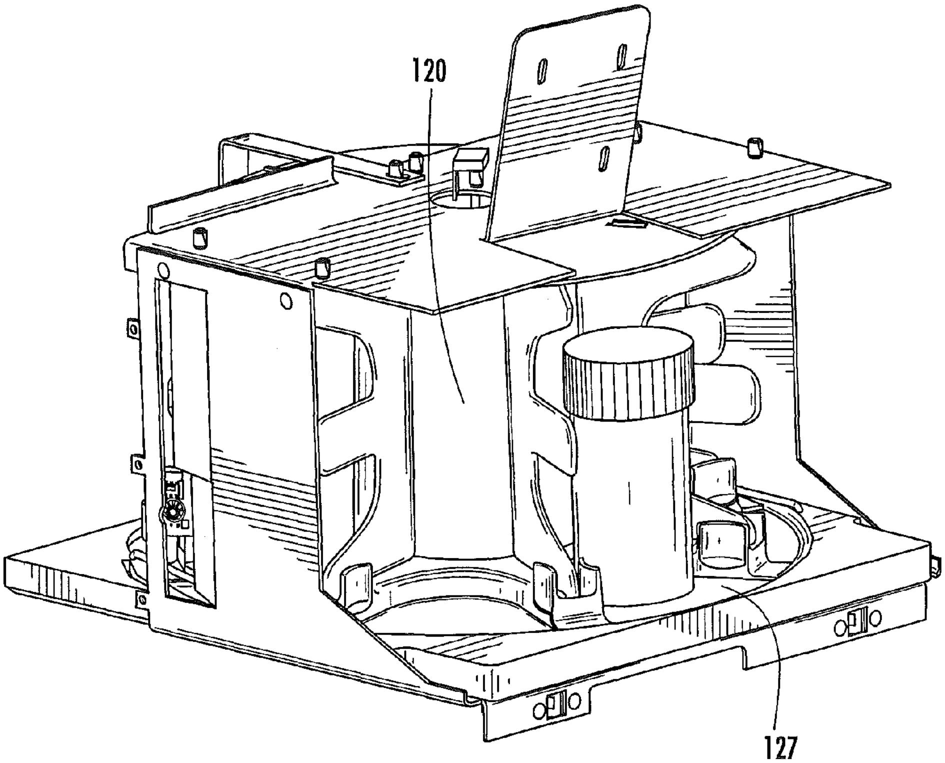
FIG. 11 is a front perspective view of the exception assembly of FIG. 4 showing the rotation of the carousel to allow access to an exception vial.

If an operator (which could be a human or robotic operator) wishes to remove one of the exception vials that is located in one of the compartments that is still positioned within the interior of the frame 44, the operator can simply push horizontally on one of the finger tabs 124*a* located within one of the compartments 127 that is presented to the exterior of the frame 44 (see FIG. 10). Once the angular displacement imposed by the operator exceeds the threshold limit for the motor 140 (typically about 2 degrees or more is to be applied by the operator to initiate rotation and 5 degrees to stop rotation, so the resulting threshold angular displacement is typically between about 0.3 and 10 degrees), the servocontroller 157 recognizes that the magnitude of the threshold angular displacement has been exceeded and responds by rotating the carousel 120 (via the motor 140) in the direction of the angular displacement for a preset angular distance. Typically, the preset angular distance is selected such that most, if not all, of the compartments that were positioned on the interior of the frame 44 prior to the application of the force are now presented to the exterior of the frame 44. For example, if seven compartments 127 are present in the carousel 120, then the motor 140 may rotate the carousel 120 over approximately 154 degrees, which is the angular expanse covered by three compartments 127. This rotation should allow the operator access to three of the compartments 127 that were previously positioned on the interior of the frame 44 and were, thus, inaccessible to the operator (see FIG. 11). In other embodiments, the carousel 120 may rotate over a predetermined angular distance of between about 40 and 240 degrees.

It should be noted that the exception assembly 100 may be configured, as described above, such that the operator can impose angular displacement in either rotative direction and cause the carousel 120 to rotate in that rotative direction. However, in some systems the exception assembly 100 may be configured to rotate only in one rotative direction.

Also, the exception assembly 100 can be configured such that, as the carousel 120 is rotating, its rotation can be halted by an angular displacement that exceeds a predetermined threshold that is opposite to the direction of rotation, or in some embodiments even by slowing the rotation. Halting the rotation may allow the operator easy access to a particular compartment 127 of interest. In this instance, when the servocontroller 157 detects the displacement in the opposite direction, it immediately begins to stop the initial rotation. It also signals controller 42 that there has been displacement in the opposite direction and controller 42 calculates the position of the most recently passed bin. Controller 42 then signals servocontroller 157 to move back to that last position. This capability can allow a user to manually halt rotation of the carousel 120 in a desired position.

It should also be noted that the guide rods 114, 116 are configured such that they overlie radially outer portions of the four compartments 127 that are located toward the rear of the exception assembly 100 (see FIG. 6). This shape enables the guide rods 114, 116 to assist in maintaining the position of vials within the recesses 124 of the base 122, particularly if the vials are picked up and replaced in a compartment by an operator. The guide rods 114, 116 may also help to keep the vials away from the sensors 118*a* and 118*b*.

It may also be desirable for the motor 140 to drive the carousel 120 at a rotational speed that allows an upright vial to remain upright and not topple over. This capability may be desirable as some vials may be regarded as exceptions because the cap is not secured properly, and a vial with an unsecured cap that topples over can spill tablets into the system. An exemplary speed for carousel rotation is between about 2 and 30 rpm.

Other embodiments of the invention may include additional functionality. For example, in some embodiments, the exception carousel 100 may be configured so that, unless the servocontroller 157 has very recently sensed an attempt to rotate the carousel 120, a user may be "locked out" while a vial is delivered to the carousel 120. Further, the exception assembly 100 may be configured to actively seek to maintain an open compartment for receipt from the carrier 68 anytime the exception assembly 100 is not already engaged. Thus, if interaction with a user causes the entry opening 127*a* to be occupied, the controller 42 can rotate the carousel to present an open compartment 127 in the entry opening 127*a*. In certain embodiments, the exception assembly 100 may be configured so that neither this function nor the system's receipt of a vial can override a user's interaction or direction. Similarly, the exception assembly 100 may be configured so that a user cannot be "locked out" from interaction while the assembly 100 seeks an open compartment 127. Other variations of such functionality may also be useful and/or desirable.

Those skilled in this art will also appreciate that the exception assembly 100 may be employed for other systems that include rotating carousels or other rotary members. For example, it may control an exception carousel or the like for a manufacturing line by receiving and presenting items that fail quality control inspections. The assembly might also be employed in a restaurant kitchen, wherein prepared dishes may be accessed by wait staff separated from the kitchen by a wall. Other applications may be apparent to those of skill in this art.

Those skilled in this art will recognize that other configurations of the exception assembly are encompassed within the present invention. For example, the numbers of compartments for containing vials may vary (seven are illustrated herein). The partitions may vary in size and shape. The motor may rotate the carousel in only one, rather than in either, rotative direction. The exception assembly may be positioned in a different location on the system 40.

Those skilled in the art may also appreciate that the "push to control" technique described above may also be used for manually directed motorized wheeled conveyance, such as a wheel chair, pulled wagon, or pallet jack. In such a vehicle, the speed of the load can be controlled precisely through servo control, but the start, stop and direction of conveyance could be controlled through natural motion of the user. As a result, a wagon or pallet jack may begin to move when pulled, stop when pushed and turn when turned, while all the time keeping the load at controlled speed up and down hills.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of controlling the presentation of objects with a rotary member, comprising the steps of:

(a) detecting, with a controller, a level of angular displacement experienced by the rotary member, the rotary member housing at least one object;

(b) if the magnitude of the detected angular displacement is below a predetermined level, maintaining an angular position of the rotary member; and (c) if the magnitude of the detected angular displacement exceeds the predetermined level, rotating the rotary member over a predetermined angular distance to present the object at a new angular position.

2. The method defined in claim 1, wherein the objects are pharmaceutical vials.

3. The method defined in claim 2, wherein the rotary member is associated with an automated pharmaceutical dispensing machine, and wherein the objects are exception pharmaceutical vials.

4. The method defined in claim 3, wherein the rotating step rotates a compartment from a non-access position facing an interior portion of the automated dispensing machine to an access position facing away from the interior portion of the automated dispensing machine.

5. The method defined in claim 1, wherein the predetermined angular distance is between about 40 and 240 degrees.

6. The method defined in claim 1, wherein the predetermined level of angular displacement is between about 2 and 10 degrees.

7. The method defined in claim 1, wherein the rotary member is a carousel with a plurality of compartments.

8. The method defined in claim 7, wherein the carousel includes features for receiving an operator's finger as it imparts angular displacement to the carousel.

9. The method defined in claim 1, wherein the controller is configured to move the rotary member over the predetermined angular distance upon a command from an operator.

10. The method defined in claim 1, wherein the controller is configured to cease rotation of the carousel when the detector detects an attempt to displace the rotating carousel in the opposite rotative direction.

* * * * *

UNITED STATES PATENT AND TRADEMARK OFFICE

CERTIFICATE OF CORRECTION

PATENT NO. : 8,321,050 B2
APPLICATION NO. : 13/535871
DATED : November 27, 2012
INVENTOR(S) : Rivenbark, Jr. et al.

It is certified that error appears in the above-identified patent and that said Letters Patent is hereby corrected as shown below:

On Title Page:

Please add item (63) Related U.S. Application Data:

(63) Continuation of application No. 12/420,223, filed on April 8, 2009, now Patent No. 8,244,398.

Please add item (60)

(60) Provisional application No. 61/050,371, filed on May 5, 2008.

Signed and Sealed this
Eighth Day of April, 2014

Michelle K. Lee
*Deputy Director of the United States Patent and Trademark Office*